Jan. 16, 1940. J. A. LA HIFF 2,187,351
TELEGRAPH SENDING MACHINE
Filed Jan. 9, 1939 2 Sheets-Sheet 1
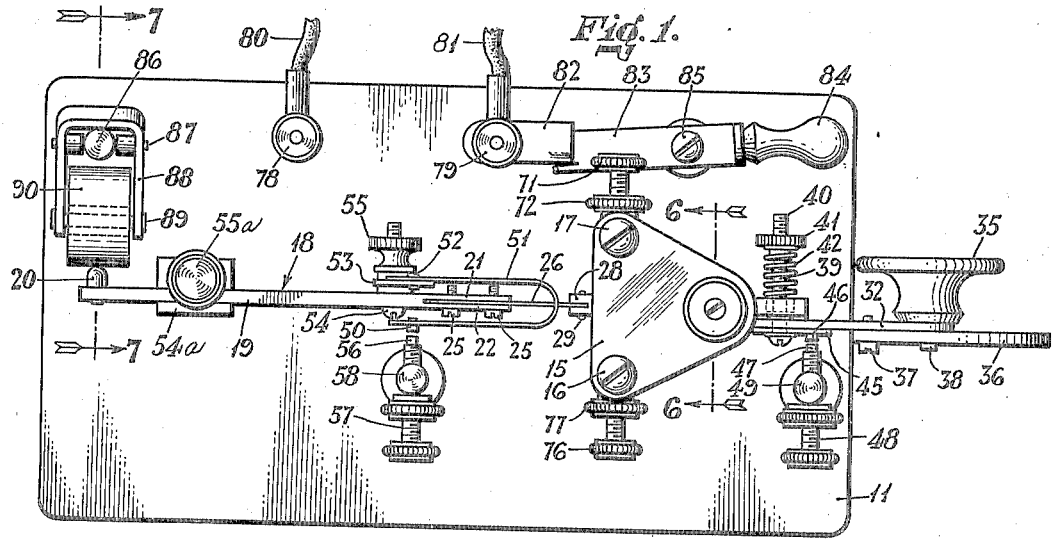
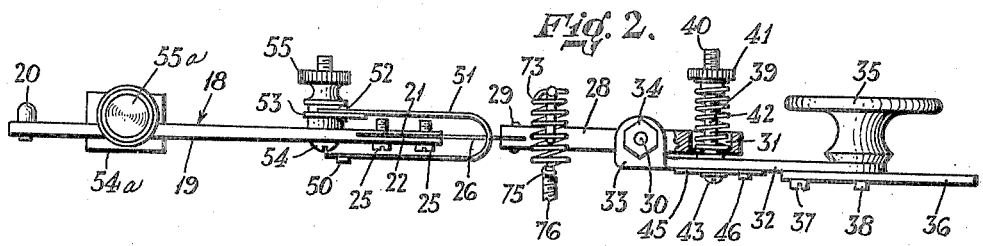
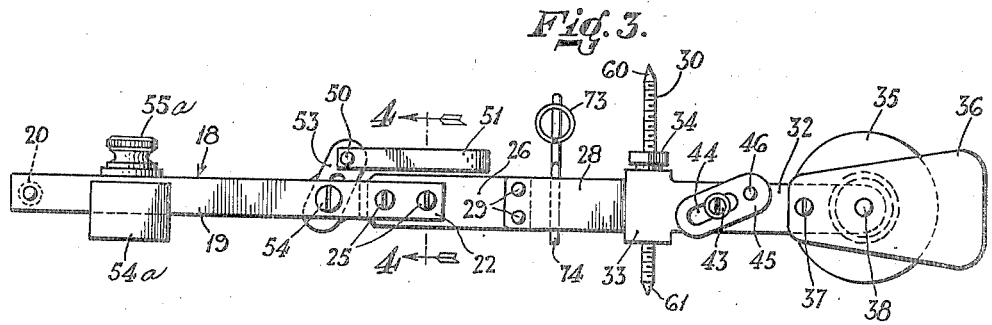
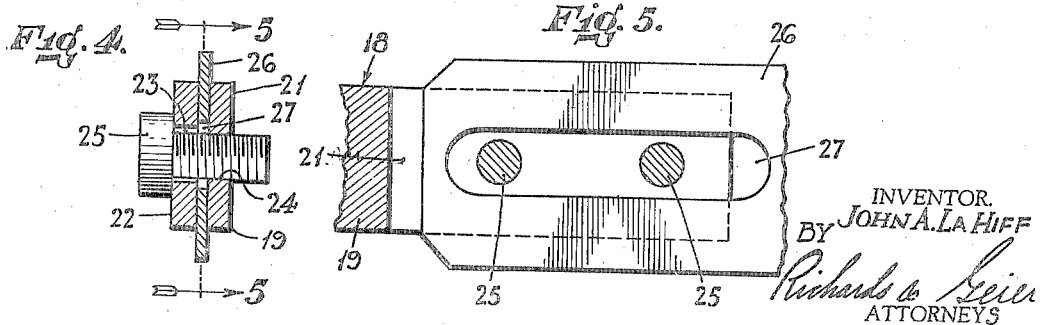
INVENTOR.
BY JOHN A. LA HIFF
Richards & Geier
ATTORNEYS Jan. 16, 1940. J. A. LA HIFF 2,187,351
TELEGRAPH SENDING MACHINE
Filed Jan. 9, 1939 2 Sheets-Sheet 2
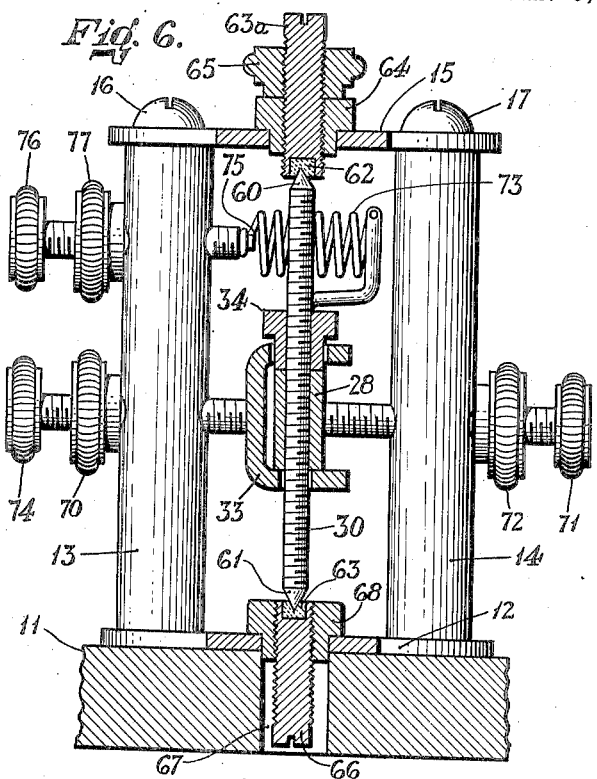
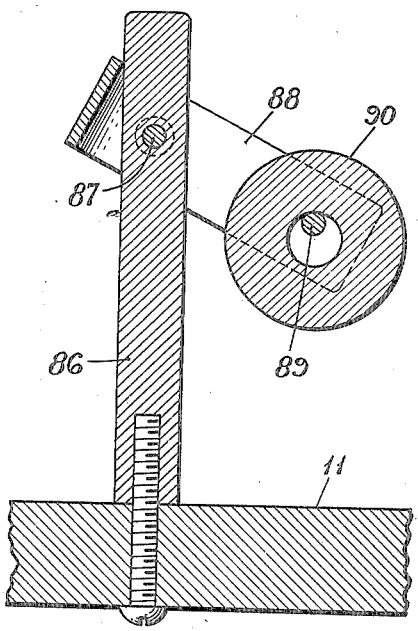
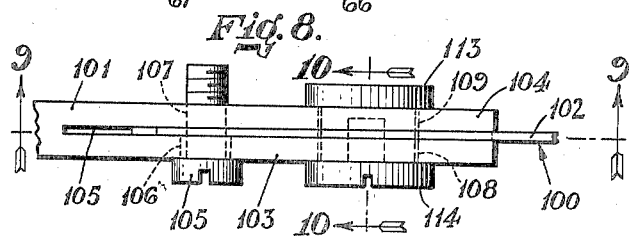
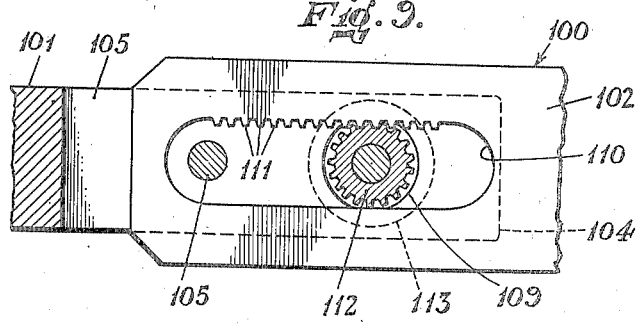
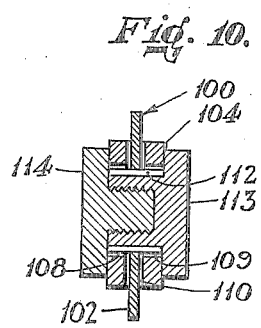
INVENTOR.
JOHN A. LA HIFF
BY
Richards & Geier
ATTORNEYS

Patented Jan. 16, 1940

2,187,351

UNITED STATES PATENT OFFICE 2,187,351

TELEGRAPH SENDING MACHINE

John A. La Hiff, New York, N. Y., assignor to The Vibroplex Co., Inc., New York, N. Y., a corporation of New York Application January 9, 1939, Serial No. 249,843

9 Claims. (Cl. 178—82)

This invention relates to a telegraphic sending machine and refers more particularly to a semi-automatic telegraphic sending machine having an operating lever a portion of which is adapted to vibrate automatically for the purpose of transmitting "dot" signals.

Machines of this type which are used in prior art, often vibrate too quickly, with the result that incorrect messages are sent by an insufficiently trained operator. The damping means of such machines are often inadequate and the operating lever used for the sending of messages, often does not move sufficiently freely.

An object of the present invention is the provision of a semi-automatic telegraphic sending machine wherein the speed with which the "dot" signals are automatically transmitted may be quickly and conveniently varied to adapt the machine to the skill of the operator using the same.

Another object is the provision of a semi-automatic telegraphic sending machine wherein the operative length of the operating lever may be quickly and conveniently adjusted for the purpose of varying the speed of vibrations.

A further object is the provision of a semi-automatic telegraphic sending machine having simple, inexpensive and effectively operating damping means for the operating lever.

A still further object is the provision of a semi-automatic telegraphic sending machine wherein the operating lever is provided with effective supporting means and is so constructed that it can be easily manipulated and removed whenever necessary.

Other objects of the present invention will become apparent in the course of the following specification.

The objects of the present invention may be realized through the provision of a lever a portion of which is adapted to be manually actuated by a sidewise motion for the purpose of transmitting the "dash" signals, another portion of said lever being caused to vibrate in order to transmit automatically the "dot" signals, the operative length of the lever being varied by constructing the lever of at least two parts which are so connected with each other that the relative positions of these parts may be easily and conveniently varied. The vibrations of the lever are damped by the use of a roller or the like which is suspended from a single post. The lever is firmly connected with a spindle the upper and lower ends of which are held in place by jewel bearings.

The invention will appear more clearly from the following detailed description when taken in connection with the accompanying drawings showing by way of example preferred embodiments of the inventive idea.

In the drawings:

Fig. 1 is a plan view of a sending machine constructed in accordance with the principles of the present invention.

Fig. 2 is a plan view of the operating lever and of the various parts connected therewith.

Fig. 3 is a side elevation of the lever shown in Fig. 2.

Fig. 4 is a section along the line 4—4 of Fig. 3 looking in the direction of the arrows.

Fig. 5 is a section along the line 5—5 of Fig. 4.

Fig. 6 is a section along the line 6—6 of Fig. 1.

Fig. 7 is a section along the line 7—7 of Fig. 1.

Fig. 8 shows a portion of an operating lever of a somewhat different construction.

Fig. 9 is a section along the line 9—9 of Fig. 8; and

Fig. 10 is a section along the line 10—10 of Fig. 3.

The sending machine shown in Figures 1 to 7 of the drawings comprises a base 11 which may be made of Bakelite, metal, wood or the like and which supports a lower plate 12 Fig. 6. Two columns or posts 13 and 14 extend through the plate 12 and are firmly connected with the base 11. An upper plate 15 which is similar to the plate 12 and which is triangular in form, is carried by the columns 13 and 14 and is attached thereto by the bolts 16 and 17.

The main operating lever 18 Fig. 1 comprises a vibrator bar 19 carrying a projection 20 which is firmly connected with the bar 19 and is adapted to strike the cylinder 90 for the purpose of damping the vibrations of the lever.

The opposite end of the bar 19 is bifurcated and is provided with two parallel leg portions 21 and 22. The portion 22 of the bar is provided with two openings 23, one of which is shown in Figure 4. Threaded openings 24 which are somewhat smaller than the openings 23, are provided in the other leg 21 of the bifurcated end portion of the bar 19 and constitute continuations of the corresponding openings 23. Set screws 25 extend through the unthreaded openings 23 and are screwed into the threaded openings 24.

The lever 18 is also provided with a vibrator spring 26 having an end which extends between the portions 21 and 22 of the bar 19 and which is provided with an elongated slot 27 enclosing the set screws 25.

The opposite end of the vibrator spring 26 is situated within a central slot provided in the main lever portion 28 Figures 2 and 3. The lever portion 28 and the spring 26 are firmly connected with each other by bolts or rivets 29 extending through the interengaging ends of these members.

The lever portion 28 is firmly connected with a threaded spindle 30 which extends through it.

One end of the lever portion 28 is provided with a transverse opening 31.

The operating lever 18 also includes a handle 32 which is provided with a U-shaped yoke 33. The two lugs of the yoke 33 enclose the lever portion 28 and are provided with openings through which the spindle 30 extends. A hexagonal nut 34 extends through one of the lugs of the yoke 33 and is in engagement with the lever portion 28.

The handle 32 carries an insulating finger piece 35 which is actuated whenever it is necessary to produce "dash" signals. An insulating thumb piece 36 which is actuated for the purpose of causing the vibrations of the operating lever is connected with the handle 32 by the screw 37 and also by the spindle 38 which carries the finger piece 35 also.

The handle 32 carries a bolt 39 which is provided with a threaded end 40 carrying a round nut 41. The bolt 39 extends through the opening 31 and is surrounded by the spring 42.

The nut 39 is used for the purpose of regulating the tension of the spring 42 which holds the handle 32 normally against the lever portion 28.

As shown in Figure 3, the bolt 43 also extends through an elongated slot 44 provided in a plate 45 carrying the electrical contact 46. The plate 45 is held in place by the bolt 43.

The contact 46 is adapted to engage a fixed contact 47 (Figure 1), which constitutes one end of contact screw 48 extending through a post 49 secured to the base 11. The two contacts 46 and 47 are used for the making of "dash" signals.

The dot signals which are made automatically are produced by a contact 50 carried upon one end of a U-shaped spring 51. The opposite end of the spring 51 is firmly connected by a rivet 52 to a plate 53. The lower end of the plate 53 is provided with an opening through which the bolt 54 extends. A nut 55 is screwed upon the projecting end of the bolt 54.

The contact 50 carried by the U-shaped spring 51 may be brought into engagement with a fixed contact 56 constituted by one end of the contact screw 57 extending through a post 58 which is attached to the base 11.

The weight of the lever 18 may be adjusted through the use of an adjustable weight 54a having the form of a square body carrying a screw 55a and provided with a longitudinal slot through which the vibrator bar 19 of the lever 18 extends. The weight 54a may be shifted along the member 19 after the screw 55a has been unscrewed.

As shown more clearly in Figure 6 of the drawings, the spindle 30 is provided with two conical ends 60 and 61 which are journaled in jewel bearings 62 and 63, respectively. The jewel bearing 62 is carried by the lower end of a screw 63a which extends through a round nut 65 a threaded sleeve 64 carried by the upper plate 15.

The lower jewel bearing 63 is carried by a screw 66 which is situated in an opening 67 provided in the base 11. The screw 66 is screwed into a sleeve 68 which is carried by the plate 12.

A screw 74 carrying a nut 70 extends through the post 13 and has a free end which is situated adjacent the lever portion 28. Another screw 71 is situated opposite the screw 74 and is carried by the post 14. The screw 71 carries the nut 72. The two screws 74 and 71 are used to regulate the throw of the operating lever 18 and the parts connected therewith.

A coiled spring 73 has an end which extends through the lever portion 28. The opposite end 75 of the spring 73 surrounds an end of an adjusting screw 76, which carries a nut 77 and extends through the post 13 above the screw 74. The spring 74 the tension of which is regulated by the screw 76, presses the lever portion 28 normally against the end of the screw 71.

The base 11 also carries posts 78 and 79 (Fig. 1) which may be attached by the wires 80 and 81 to any suitable source of electrical energy which is not shown in the drawings. The post 79 is provided with a conducting plate 82 which may be brought into engagement with a lever 83 rotatably mounted upon a pivot 85 and having an insulating handle 84.

The contact post 78 is electrically connected with the contacts 50 and 46 by any suitable means well known in the art and not illustrated in the drawings. The post 79 may be connected by means of the lever 83 with the contacts 56 and 47.

The device used for damping the vibrations of the lever 18 comprises a post 86 (Fig. 1) which is carried by the base 11 and which carries a rod 87 extending horizontally through an opening formed in the post 86. The rod 87 carries a U-shaped support 88 which may be somewhat tilted in relation to the horizontal plane, as shown in Figure 7. The support 88 carries a rod 89. A cylinder 90 is freely mounted upon the rod 89 and is situated between the projections of the U-shaped support 88.

The projection 20 is situated somewhat below the center of the cylinder 90 so that when the projection 20 strikes the cylinder 90 it will cause the support 88 to swing upwardly upon the rod 87, thus increasing the damping effect of the cylinder 90.

In operation, in order to send the "dot" signals of a message the operator moves the thumb piece 36 of the lever 18 to the right (looking in the direction of the arrows 6—6 in Figure 1), thereby rotating the lever portion 28 on the spindle 30 and compressing the spring 73 until the lever portion 28 strikes the free end of the screw 74. This sets the vibrator bar 19 of the lever 18 and the connected parts in vibration and causes a series of makes and breaks of circuit between the contact 50 carried by the U-shaped spring 51 and the contact 56. Thus the machine sends the "dots" of a message automatically, the number of the "dots" being determined by the length of time the operator holds the thumb piece 36 in the described position. As soon as the operator lets go of the thumb piece 36, the spring 73 will cause the return of the lever 18 back to its normal position.

In order to send the "dashes" of a message the operator moves the finger piece 35 in the opposite direction, thus turning the handle 32 upon the spindle 30 and bringing the contact 46 into engagement with the contact 47. Each time after a "dash" signal has been sent, the spring 42 returns the handle 32 back to its normal position.

In accordance with the present invention, the amplitude of the vibrations of the vibrator bar 19 may be easily regulated or adjusted to adapt the machine to the requirements or the skill of each individual operator; in order to vary the operative length of the vibrating portions of the operating lever 18 and thus vary the speed with which the "dot" signals are produced, it is merely necessary to unscrew the springs 25 and adjust the vibrator bar 19 in relation to the vibrator spring 26 until the two parts assume the required position. Then the screws 25 are fastened again and the machine is ready for operation.

Due to the provision of the jewel bearings 62 and 63 the spindle 30 will turn upon its bearings even if the manual force applied to the handle portion of the operating spring 18 is extremely small. Thus the operation of the machine is considerably facilitated and any strain upon or cramping of the fingers is avoided.

Due to the inclined position of the cylinder 90 and the position of the projection 20 below the center of gravity of the cylinder 90 a perfect damping of the vibrator bar 19 is attained.

The operating lever 100 shown in Figures 8 to 10 of the drawings comprises a vibrator bar 101 and a vibrator spring 102. The vibrator bar 101 has a bifurcated end consisting of the leg portions 103 and 104 which are separated by the slot 105. The portion 103 is provided with a cylindrical slot 106 while a smaller threaded opening 107 is provided in the member 104 opposite the opening 106. The members 103 and 104 are also provided with alined openings 108 and 109, respectively.

The vibrator spring 102 is provided with a central elongated slot 110. The upper edge of the slot 110 has teeth 111 meshing with a toothed wheel 112 which is firmly connected with a disk 113 situated outside of the member 104. The toothed wheel 112 is provided with an inner threaded opening and a screw 114 situated outside of the member 103 is screwed into this threaded opening.

By means of this arrangement the operative length of the vibrator lever 100 may be adjusted at will, first by loosening the tightening screw 105 which extends through the opening 106 and is screwed into the opening 107. Then the screw 114 is rotated; the gear wheel 112 will rotate along with the screw 114, thus shifting the vibrator spring 102 within the slot 105. The operative length of the vibrator spring 102 and consequently the amplitude of the vibrations of the vibrator bar 101 may thus be quickly and conveniently varied.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. In an operating lever for telegraphic semi-automatic sending machines, a resilient portion, a non-resilient portion having one end connected with an end of said resilient portion and means for varying the relative positions of said resilient and non-resilient portions to vary the amplitude of vibrations of a portion of said operating lever.

2. In an operating lever for a telegraphic semi-automatic sending machine, a vibrator spring, a vibrator bar having one end connected with one end of said vibrator spring, and means for varying the relative positions of said vibrator spring and vibrator bar to vary the amplitude of vibrations of said vibrator bar.

3. In an operating lever for a telegraphic semi-automatic sending machine, a vibrator spring having an elongated slot formed in an end thereof; a vibrator bar having a slot formed therein, the slot of the vibrator bar receiving said end of the vibrator spring, and a tightening screw carried by said vibrator bar and extending through the two slots.

4. In an operating lever for a telegraphic semi-automatic sending machine, a vibrator spring having an elongated slot formed in an end thereof; a vibrator bar having a slot formed therein, the slot of the vibrator bar receiving said end of the vibrator spring, a non-threaded opening being formed in said vibrator bar on one side of the slot thereof, another threaded opening in alinement with the non-threaded opening being formed in said vibrator bar on the opposite side of its slot, and a tightening screw extending through the two slots, said tightening screw being screwed into the threaded opening and extending through the non-threaded opening.

5. In a telegraphic semi-automatic sending machine having a vibrating lever portion; a damping device for said vibrating lever portion, said damping device comprising a post, a support rotatably carried by said post, and a cylinder rotatably carried by said support and adapted to be engaged by said vibrating lever portion to damp the vibrations thereof.

6. In a telegraphic semi-automatic sending machine having a vibrating lever portion; a damping device for said vibrating lever portion, said damping device comprising a vertical post, a support swingably mounted in said post and extending normally at an acute angle to a horizontal plane, and a cylinder rotatably carried by said support and adapted to be engaged by said vibrating lever portion to damp the vibrations thereof, the center of gravity of said cylinder being higher than any point of contact between the cylinder and the vibrating lever portion.

7. In a telegraphic semi-automatic sending machine having an operating lever comprising a vibrating portion and a non-vibrating portion connected with said vibrating portion; and a spindle extending through said non-vibrating portion and firmly connected therewith; jewel bearings supporting two ends of said spindle and means carrying said jewel bearings.

8. A telegraphic semi-automatic sending machine, comprising, in combination, an operating lever having a non-vibrating portion adapted to transmit "dash" signals, and a vibrating portion adjustably connected with said non-vibrating portion and adapted to transmit "dot" signals; damping means comprising a post, a support rotatably carried by said post, and a cylinder rotatably carried by said support and adapted to be engaged by said vibrating lever portion to damp the vibrations thereof; a spindle extending through said non-vibrating portion and firmly connected therewith; jewel bearings supporting two ends of said spindle and means carrying said jewel bearings.

9. In an operating lever for a telegraphic semi-automatic sending machine, a vibrator spring having an elongated slot formed in an end thereof; a vibrator bar having a slot formed therein, the slot of the vibrator bar receiving said end of the vibrator spring, an edge of the slot of said vibrator spring having teeth formed therein, and a toothed member rotatably mounted in said vibrator bar and meshing with said teeth to vary the operative length of said vibrator spring.

JOHN A. LA HIFF.